(12) United States Patent
Watanabe

(10) Patent No.: US 8,302,918 B2
(45) Date of Patent: Nov. 6, 2012

(54) FASTENING BRACKET OF DECK CROSS MEMBER

(75) Inventor: Daisuke Watanabe, Soja (JP)

(73) Assignee: Asteer Co., Ltd, Okayama (JP)

( * ) Notice: Subject to any disclaimer, the term of this patent is extended or adjusted under 35 U.S.C. 154(b) by 70 days.

(21) Appl. No.: 13/088,952

(22) Filed: Apr. 18, 2011

(65) Prior Publication Data

US 2011/0253857 A1 Oct. 20, 2011

(30) Foreign Application Priority Data

Apr. 16, 2010 (JP) .................................. 2010-94821

(51) Int. Cl.
*E04G 25/00* (2006.01)
(52) U.S. Cl. .......................... 248/201; 248/214; 248/300
(58) Field of Classification Search .................. 248/201, 248/214, 223.41, 224.8, 222.14, 300; 296/193.2, 296/70, 72
See application file for complete search history.

(56) References Cited

U.S. PATENT DOCUMENTS

| 7,320,290 B2 * | 1/2008 | Watanabe et al. ......... 114/144 R |
| 2011/0233964 A1 * | 9/2011 | Matsutani et al. ....... 296/193.02 |
| 2012/0049573 A1 * | 3/2012 | Atsumi .................... 296/193.02 |
| 2012/0168583 A1 * | 7/2012 | Hsu et al. ................. 248/222.14 |

FOREIGN PATENT DOCUMENTS

| JP | 3778762 B | 5/2006 |
| JP | 2006-199050 A | 8/2006 |

* cited by examiner

*Primary Examiner* — Ramon Ramirez
(74) *Attorney, Agent, or Firm* — DLA Piper LLP (US)

(57) ABSTRACT

The present invention provides a fastening bracket for fastening right and left ends of a deck cross member to respective fitting parts of a vehicle body frame. The fastening bracket includes a body plate to which one of the ends of the deck cross member is connected, a surface contact plate to which a fastening nut corresponding to a bolt to be inserted into corresponding one of the fitting parts of the vehicle body frame is fixed, the surface contact plate being provided in the body plate, a connection plate that is a part for connecting the body plate and the surface contact plate, the connection plate having a width in a direction perpendicular to a connecting direction of the body plate and the surface contact plate equal to or smaller than the surface contact plate, and a demarcating slit for demarcating the body plate and the surface contact plate.

7 Claims, 15 Drawing Sheets

FASTENING BRACKET OF DECK CROSS MEMBER

BACKGROUND OF THE INVENTION

1. Field of the Invention

The present invention relates to a fastening bracket for attaching a deck cross member structuring a steering support frame to a vehicle body frame.

2. Description of the Related Art

A steering support frame is structured of a deck cross member bridged between right and left vehicle frames. The deck cross member is fixed with bolting fastening brackets attached to respective right and left ends thereof with respect to fitting parts of the vehicle frames. In this context, there is no problem when a fastening bracket is surface contacted with the corresponding fitting part without a gap or a deviation therebetween. However, a gap inevitably exists between the fastening bracket and the fitting part. Furthermore, a positional deviation between the fastening nut and a bolt hole is inevitable. There is a problem in that the fastening bracket is deformed and strength (mechanical strength) is lowered when the fastening bracket is bolted to the fitting part in such a condition. A gap between the fastening bracket and the fitting part can be eliminated by interposing a spacer therebetween. However, a problem occurs that the number of parts and the number of steps are increased. In order to solve such a problem, there have been proposed fastening brackets disclosed in Japanese Patent No. 3778762 and Japanese Patent Application Publication No. 2006-199050.

In Japanese Patent No. 3778762, a gap with a fitting part is adjusted by providing a relative difference in strength of fastening brackets (cylindrical flange parts) attached to right and left ends of a deck cross member (frame). Specifically, a fastening bracket having higher strength is surface contacted with a vehicle body frame (pillar) for bolting and a fastening bracket having lower strength is deformed when used for bolting to the vehicle body frame. A deformation anticipated part that is elastically deformed or plastically deformed is disclosed as means for providing the relative difference in strength of the fastening brackets. For example, a crossing groove (groove part 5a) and a crossing hole (long hole 5b) formed between a boss (boss part 6) and a fastening nut (nut 8) for connecting a deck cross member are disclosed as specific examples of the deformation anticipated part (see FIG. 8 and FIG. 9 of Japanese Patent No. 3778762).

In Japanese Patent Application Publication No. 2006-199050, a dimensional adjustment deforming section 20 is formed to surround a fastening nut (project nut 11) in a fastening bracket (attachment mechanism 10) to be attached to each of the right and left ends of a deck cross member (steering member 1). Accordingly, the dimensional adjustment deforming section 20 is deformed towered a vehicle body frame (vehicle body side) to eliminate a gap between the fastening bracket and a fitting part. The dimensional adjustment deforming section 20 is formed by disposing a long hole (slit 20a) to surround the vicinity of a fastening nut (described as the "projection bolt 8" in the specification although considered as a misdescription of the "projection nut 11") (see FIG. 4 of Japanese Patent Application Publication No. 2006-199050).

The fastening bracket having the "deformation anticipated part" or "a dimensional adjustment deforming section" described in Japanese Patent No. 3778762 and Japanese Patent Application Publication No. 2006-199050 does not need to interpose a spacer, so that the number of parts and the number of steps can be reduced. However, when a positional deviation exists between the fastening nut and the bolt hole, the deformation anticipated part or the dimensional adjustment deforming section may be burred. This results in insufficient elastic deformation or plastic deformation of the deformation anticipated part or the dimensional adjustment deforming section, and makes it impossible to eliminate a gap between the fastening bracket and the fitting part. Furthermore, a bolt that is screwed into the fastening nut may be inclined. This may cause a male screw to strip a female screw of the fastening nut, resulting in a fastening torque loss. In addition, sufficient fastening intensity of the bolt may not be secured, resulting in loosening of the bolt due to vibration generated while traveling, for example.

An object of the present invention is to provide a fastening bracket capable of adjusting a gap between the fastening nut and the fitting part and a positional deviation between the fastening nut and the bolt hole by elastic deformation or plastic deformation of a part including the fastening nut.

SUMMARY OF THE INVENTION

The above-mentioned problems are solved by a fastening bracket of a deck cross member used for fastening right and left ends of the deck cross member to respective fitting parts of a vehicle body frame. The fastening bracket includes a body plate to which one of the ends of the deck cross member is connected, a surface contact plate to which a fastening nut corresponding to a bolt to be inserted into corresponding one of the fitting parts of the vehicle body frame is fixed, the surface contact plate being provided in the body plate, a connection plate that is a part for connecting the body plate and the surface contact plate, the connection plate having a width in a direction perpendicular to a connecting direction of the body plate and the surface contact plate equal to or smaller than a width of the surface contact plate, and a portion defining a demarcating slit for demarcating the body plate and the surface contact plate. In the fastening bracket according to the invention, the connection plate is elastically deformed or plastically deformed in a direction in which the surface contact plate is close to and apart from the fitting part to adjust a gap between the surface contact plate and the fitting part. Since the connection plate according to the invention has the width (width in a direction perpendicular to a connecting direction of the body plate and surface contact plate) equal to or smaller than the width of the surface contact plate, the connection plate is susceptible to elastic deformation or plastic deformation in a planar direction parallel to the fitting parts. The deformation allows an adjustment of a positional deviation between the fastening nut fixed to the surface contact plate and a bolt hole.

It is preferable to provide the connection plate on a side opposite to a connecting part of the body plate to which the end of the deck cross member is connected to have a positional relationship to sandwich the surface contact plate between the body plate and the connection plate.

The surface contact plate is formed by removal of a portion of the body plate. In other words, the surface contact plate and the body plate are demarcated by a hole formed by removal of plate material, except for the plate material of the connection plate. A method of the removal is not specially limited. When the bracket is formed by casting, a shape corresponding to a casting mold is provided. When the bracket is formed by roll forming or press forming, a material removing hole is formed by punching out a plate material of the bracket. Hereinafter, the hole formed by the removal of the plate material is referred to as a "demarcating slit".

The demarcating slit is provided to surround the surface contact plate. In other words, the demarcating slit is continuously provided at a portion between a connecting part of the body plate to which an end of the deck cross member is connected and the surface contact plate, and sides of the surface contact plate parallel to the connecting direction of the body plate and the surface contact plate. For example, when the surface contact plate has a square shape in front view, and when the surface contact plate is provided above the connecting part of the body plate to which an end of the deck cross member is connected, the connection plate is configured such that the upper side of the surface contact plate is elongated upward to be connected to the body plate, and the demarcating slit becomes a U shape in front view in which a left side, a lower side, and a right side are continued.

Examples of the connection plate include (1) a connection plate structured of an intermediate plate provided with a deformation slit, and a pair of cross linking plates that connect the body plate with the intermediate plate and the surface contact plate with the intermediate plate, the cross linking plates having a width smaller than the intermediate plate. It is preferable that the cross linking plates for connecting the body plate with the intermediate plate and the surface contact plate with the intermediate plate be formed by elongating the demarcating slit to surround a periphery of the cross linking plates. The connection plate of the above-mentioned feature (1) adjusts a gap between the surface contact plate and the fitting part and a positional deviation between a fastening nut fixed to the surface contact plate and a bolt hole by elastically deforming or plastically deforming the intermediate plate.

An another example of the connection plate is (2) a connection plate structured of a cross linking plate having a uniform width in a width direction and being bent in a thickness direction. In the cross linking plate, an end of the cross linking plate is connected to the body plate and the other end is connected to the surface contact plate. The cross linking plate structuring the connection plate may be a piece of plate having a width equal to that of the surface contact plate, or a plurality of cross linking plates having a width smaller than that of the surface contact plate. The connection plate of the above-mentioned feature (2) adjusts a gap between the surface contact plate and the fitting part by increasing and decreasing flexion of the cross linking plate. Furthermore, the connection plate is bent by expansion and contraction of the flexion and change in levels of the flexion or expansion and contraction in the width direction to adjust a positional deviation between the fastening nut fixed to the surface contact plate and the bolt hole.

Another example of the connection plate is (3) a connection plate structured of a deformation beam sandwiched between a body slit provided in the body plate and the demarcating slit, and a cross linking plate extending from the deformation beam and connected to the surface contact plate. It is preferable that the body slit be perpendicular to the connecting direction of the body plate and the surface contact plate connected by the connection plate, longer than the width of the cross linking plate, and shorter than the maximum outer shape width of the demarcating slit surrounding the connection plate. Accordingly, the deformation beam becomes longer than the cross linking plate, and shorter than the maximum outer shape width of the demarcating slit surrounding the connection plate, and the deformation beam can be fully elastically deformed or plastically deformed while restraining lowering of strength of the body plate. The connection plate of the above-mentioned feature (3) adjusts a gap between the connection plate and the fitting part and adjusts a positional deviation between the fastening nut fixed to the surface contact plate and the bolt hole by elastically deforming or plastically deforming the deformation beam.

The fastening bracket according to the invention adjusts a gap between the surface contact plate and the fitting part and adjusts a positional deviation between the fastening nut fixed to the surface contact plate and the bolt hole by elastically deforming or plastically deforming the cross linking plates structuring the connection plate, the intermediate plate sandwiched by the pair of cross linking plates, or the deformation beam extending from the cross linking plates. It is preferable that the surface contact plate be provided with a collar to be locked into a bolt hole provided at the fitting part of the vehicle body frame, in order that the surface contact plate can come close to the fitting part while keeping a parallel state for easy matching of the fastening nut and the bolt hole. The collar also functions as a member for guiding a bolt to be screwed into the fastening nut through the bolt hole.

Since the collar is a member for specifying a positional relationship of the surface contact plate to the bolt hole at the fitting part, the collar may be any of a projection flange and an arc flange as far as it can be fitted to the bolt hole. However, it is preferable that the collar be structured as a cylindrical flange from a view point to specify a positional relationship of the surface contact plate without causing a positional deviation in any direction to the bolt hole. Specific examples of the collars include the following three types: (a) a cylindrical flange being formed by burring processing when a through hole communicated with a screw hole of the fastening nut is provided through the surface contact plate, (b) a cylindrical flange (independent body from the fastening nut) being fitted to the through hole of the surface contact plate, and (c) a cylindrical flange integrally structured with the fastening nut being fitted to the through hole of the surface contact plate.

The fastening bracket according to the invention adjusts a gap between the surface contact plate and the fitting part and a positional deviation between the fastening nut and the bolt hole through the elastic deformation or plastic deformation of the connection plate. This is a mechanism of the surface contact plate that is elastically deformed or plastically deformed in a direction close to or apart from the fitting part similarly to a conventional similar type of fastening bracket. In addition to the deformation in the above-mentioned direction, the connection plate according to the invention is bent in a planner direction parallel to the fitting part to be elastically deformed or plastically deformed. Furthermore, since the connection plate is elastically deformed or plastically deformed to the body plate and the surface contact plate, preventing the body plate and the surface contact plate from being elastically deformed or plastically deformed. Accordingly, the bracket according to the invention has an advantage in that residual stress is hardly generated in the body plate and the surface contact plate.

The collar has a function to cause the surface contact plate to come close to the fitting part while keeping a parallel state for easy matching of the fastening nut and the bolt hole. Furthermore, the collar has a function to guide a bolt to be screwed into the fastening nut through the bolt hole when the fastening bracket is fastened to the vehicle body frame. With the collar, the above-mentioned advantage (that only the connection plate is intensively deformed) becomes pronounced. Furthermore, a danger that the fastening nut is stripped by the bolt can be reduced by preventing inclination of the bolt to be screwed into the fastening nut. Since a fastening torque loss can be restrained when the bolt is being screwed, the assembly operation becomes simple. Furthermore, since it becomes possible that the surface contact plate is surface contacted with the fitting part without fail to fasten the fastening nut, sufficient fastening strength of the bolt can be ensured. Accordingly, the danger of loosening of the bolt due to vibration generated while traveling, for example, can be eliminated.

DETAILED DESCRIPTION OF THE PREFERRED EMBODIMENTS

Figure 1:
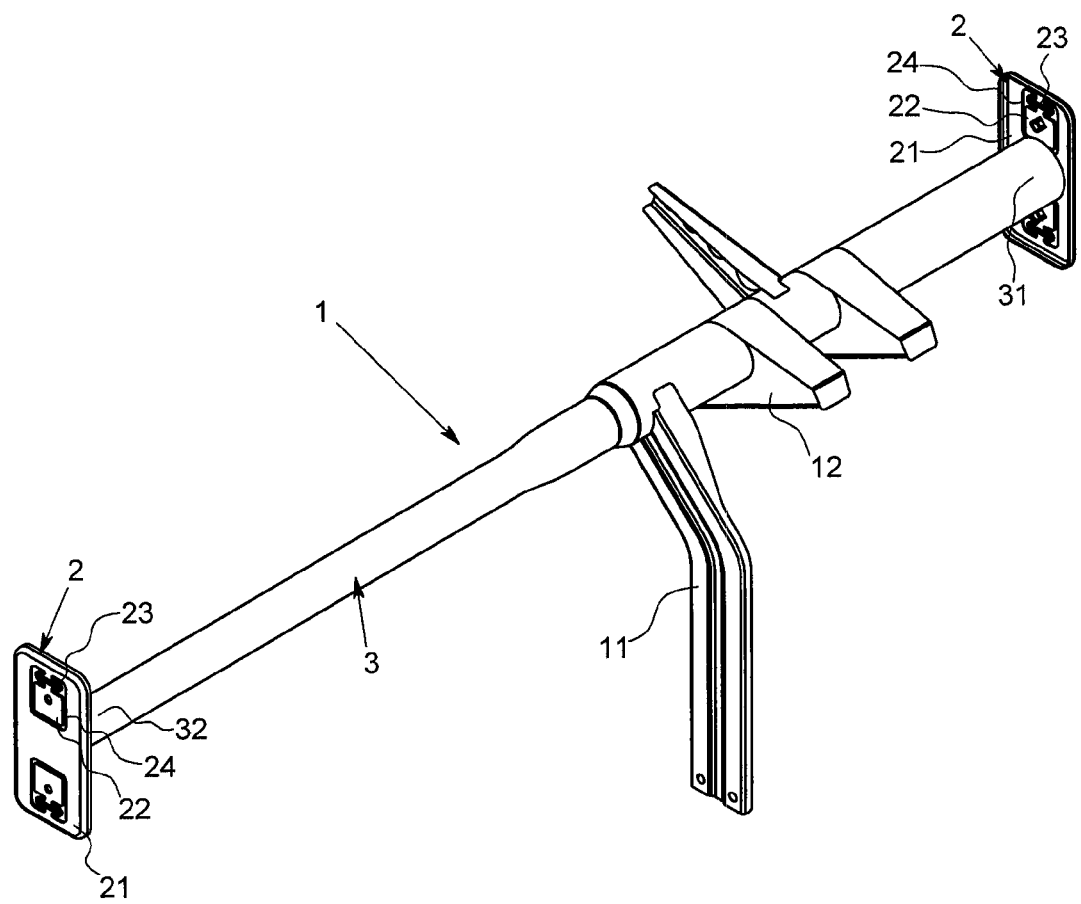
FIG. 1 is a perspective view of a steering support frame structured by using fastening brackets according to the invention as viewed from behind.
Figure 2:
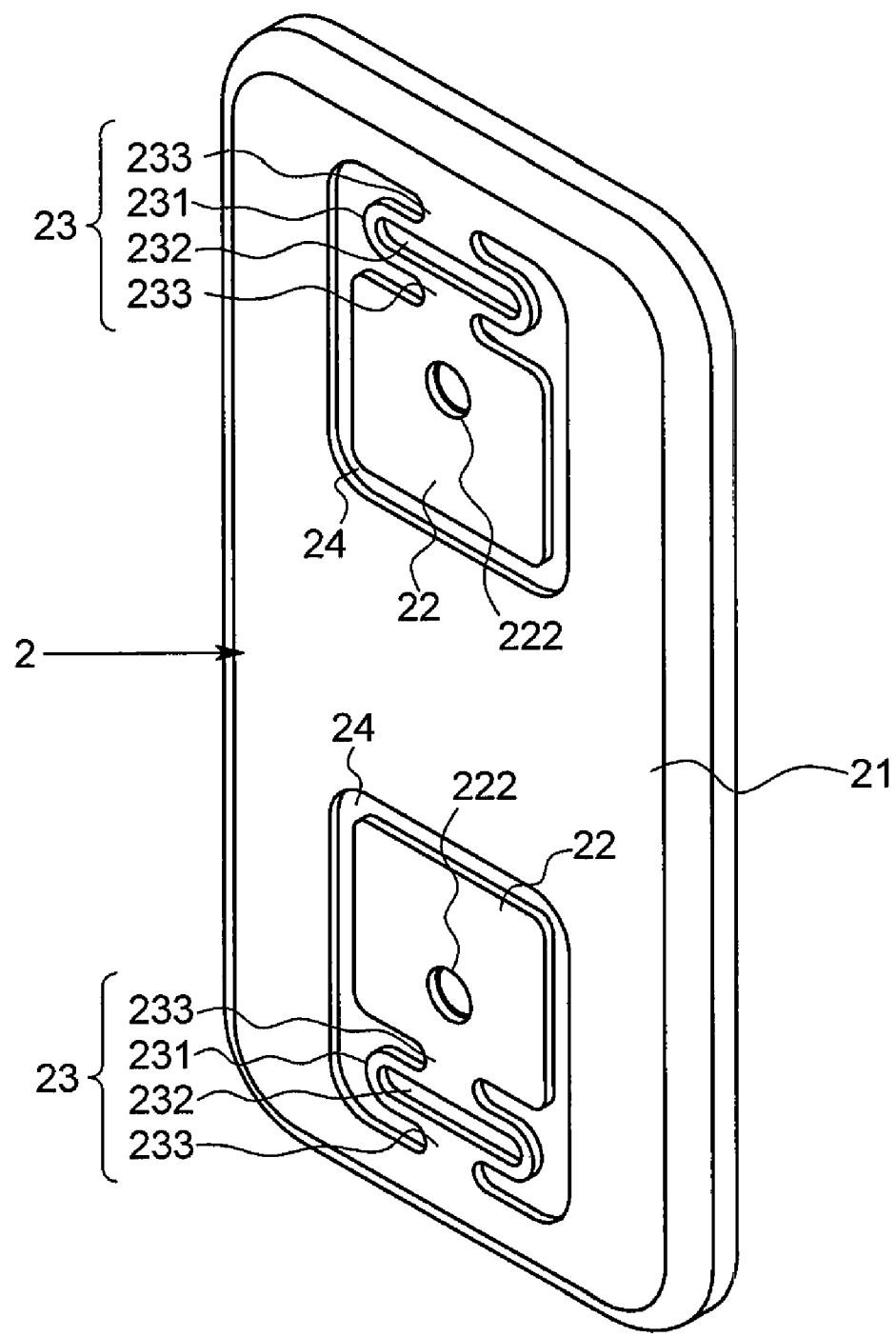
FIG. 2 is a perspective view of the fastening bracket on a passenger seat side as viewed from the left side.
Figure 3:
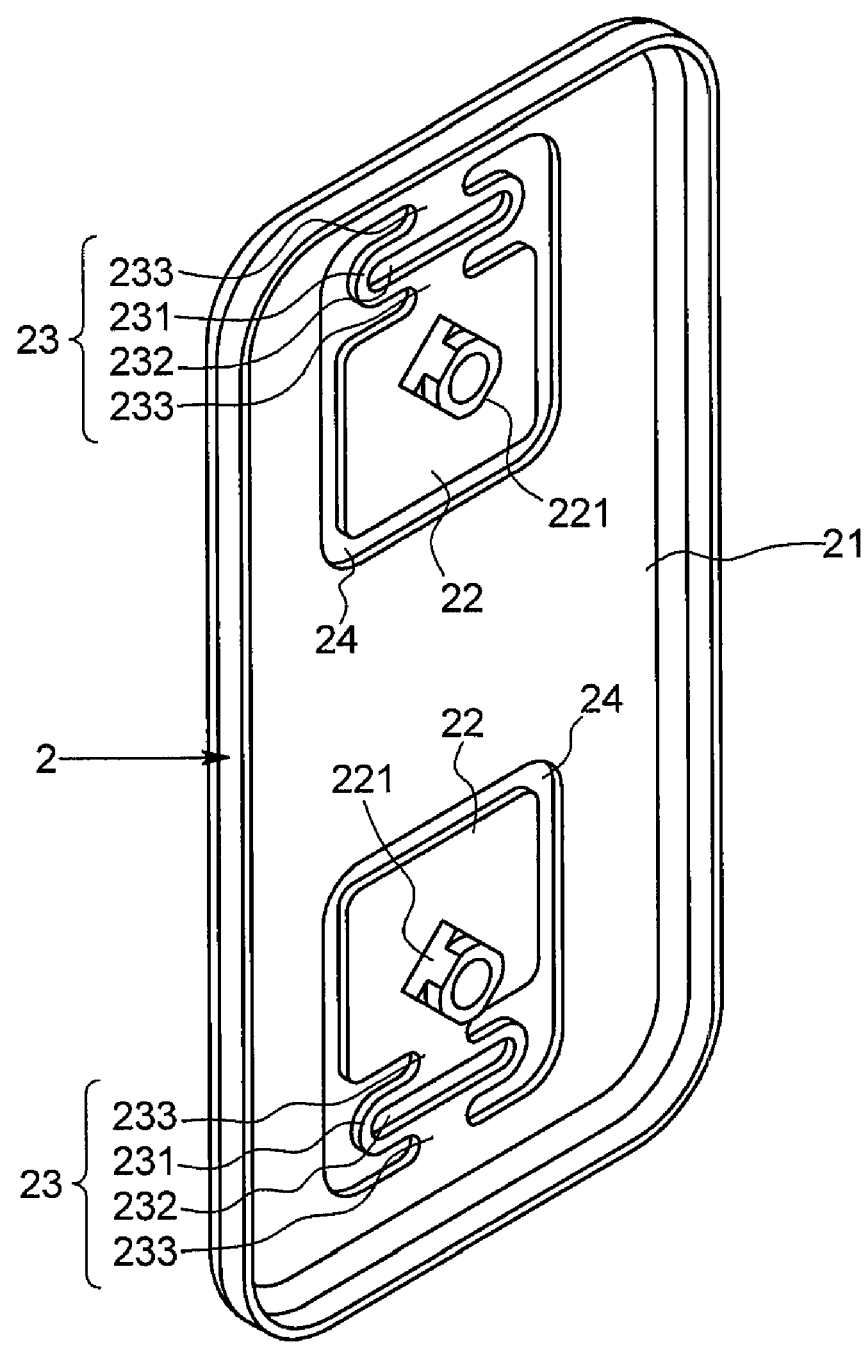
FIG. 3 is a perspective view of the fastening bracket on the passenger seat side as viewed from the right side.

Hereinafter, an embodiment of the present invention will be described with reference to the accompanying drawings. As illustrated in FIG. 1, fastening brackets 2 according to the invention are joined to respective both ends of a deck cross member 3. The deck cross member 3 is fixed to a vehicle body frame 4 and used as a steering support frame 1. The fastening brackets 2 are joined to a driver seat side end 31 and a passenger seat side end 32 of the deck cross member 3 by welding. The deck cross member 3 in this example is basically a metal straight pipe having a circular cross section, and has different shapes on both ends with a larger diameter on the driver seat side and a smaller diameter on the passenger seat side. An intermediate stay 11 and a column bracket 12 are attached on the driver seat side having a larger diameter. The fastening brackets 2 on the driver seat and passenger seat sides have exactly the same specifications (that is, common to the right and left sides). However, since the deck cross member 3 is a pipe with both ends having different diameters, joint relationships between the driver seat side end 31 and the passenger seat side end 32 with respect to the respective fastening brackets 2 are different as described below.

As illustrated in FIGS. 2 to 5, each fastening bracket 2 in this example includes a body plate 21 for connecting the passenger seat side end 32 of the deck cross member 3, a surface contact plate 22 to which a fastening nut 221 is fixed, a connection plate 23 whose width (in the horizontal direction in this example) perpendicular to the connecting direction of the body plate 21 and the surface contact plate 22 (in the vertical direction in this example) is equal to or smaller than the a width of the surface contact plate, and a demarcating slit 24 formed between the body plate 21 and the surface contact plate 22. The body plate 21 and the surface contact plate 22 are connected with the connection plate 23 interposed therebetween. The right and left fastening brackets 2 in this example are common members, and are jointed on the right and left ends, respectively, of the deck cross member 3 in mirror symmetry on both the driver seat and passenger seat sides (facing each other).

The body plate 21 forms a circular flange with its rim bent forward (rightward in FIG. 2 and toward the viewer of FIGS. 4 and 5), and is a plate member having a rectangular shape in front view with increased rigidity as a whole. A pair of surface contact plates are provided in vertical symmetry within a planer surface range surrounded by the circular flange. The body plate 21 is a basal member when the connection plate 23 is elastically deformed or plastically deformed. When the surface contact plate 22 is fastened to the vehicle body frame 4 on the passenger seat side, the body plate 21 is in a position fixed state with a gap to the vehicle body frame 4 (see FIG. 9). The body plate 21 is required to have sufficient rigidity so as not be deformed to the connection plate 23 and to keep a planner shape. For this reason, the rigidity of the body plate 21 is increased by providing a circular flange at the rim as in this example or by forming beads in the plane to increase the section modulus aside from or in combination with the circular flange.

The surface contact plate 22 is a plate member having a square shape in front view whose periphery is surrounded by the demarcating slit 24 except the connection plate 23. Since the body plate 21, the surface contact plate 22, and the connection plate 23 (intermediate plate 231 and pair of cross linking plates 233) are structured by a piece of successive plate member, the plates are formed all at once by, for example, punching out the demarcating slit 24 and a deformation slit 232 during press working. Accordingly, in a stage where the connection plate 23 is not elastically deformed or plastically deformed, the body plate 21, the surface contact plate 22, and the connection plate 23 are positioned on the same plane. While the shape of the surface contact plate 22 in front view is not specifically limited, it is preferable that the surface contact plate 22 have a size large enough to be stably face contacted with the vehicle body frame 4.

Figure 9:
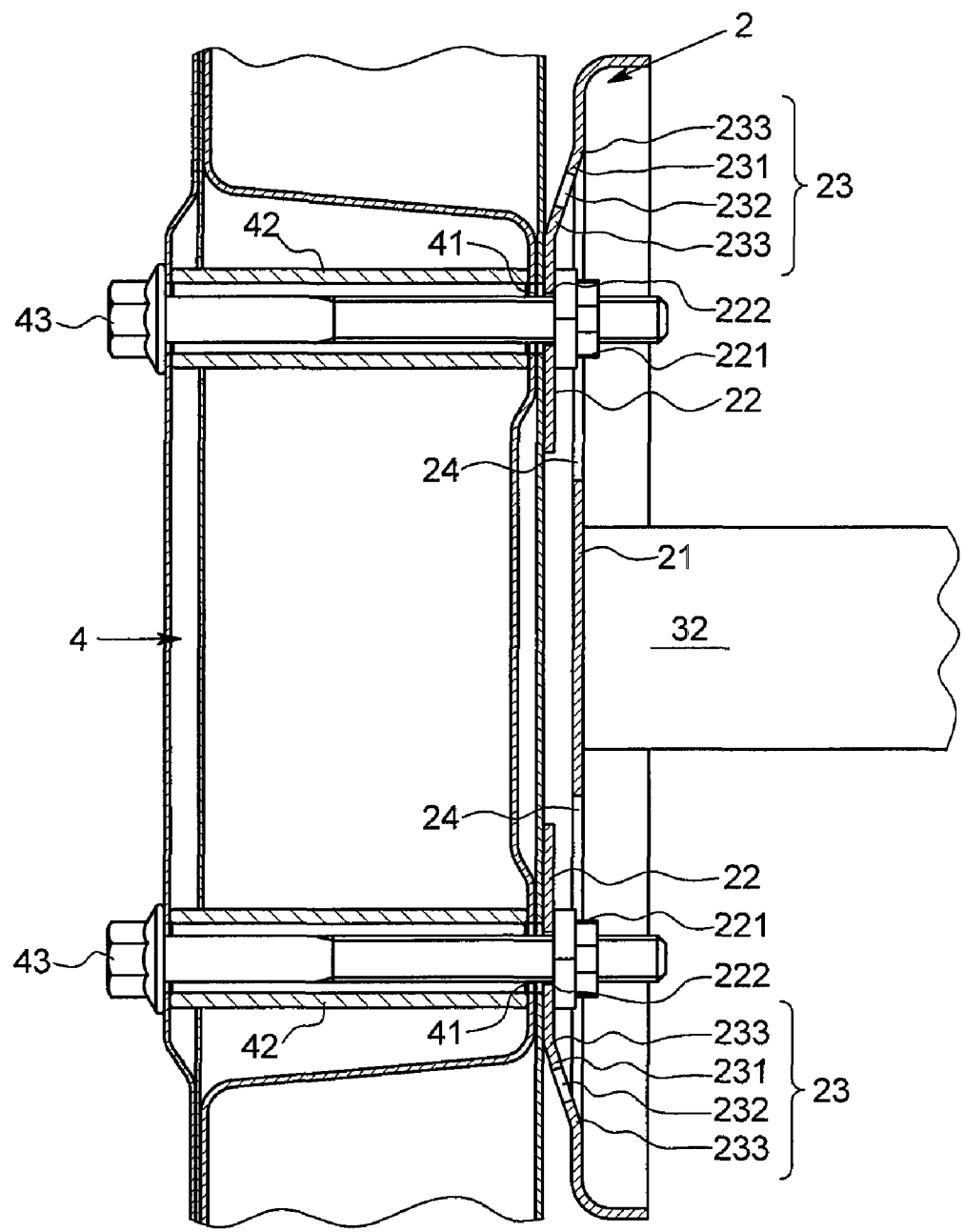
FIG. 9 is a vertical cross sectional view illustrating a state where the fastening bracket on the passenger seat side has been connected to the vehicle body frame.

The surface contact plate 22 in this example is face contacted with the vehicle body frame 4 by tightening bolts 43 to elastically deform or plastically deform the connection plate 23 (see FIG. 9). A though hole 222 is provided at a position closer to the cross linking plate 233 side from the center, in order that load generated by tightening of the bolt 43 can be applied at a position near the connection plate 23. The fastening nut 221 is fixed at the front side by welding so as to be communicated with the through hole 222. The through hole 222 is provided close to the cross linking plate 233 side, so that load generated by tightening of the bolt 43 can easily cause elastic deformation or plastic deformation of the connection plate 23, and buckling of the surface contact plate 22 caused by the connection plate 23 not elastically deformed or plastically deformed can be prevented. In order to prevent buckling of the surface contact plate 22, beads may be provided in the surface contact plate 22 to increase its rigidity.

The connection plate 23 includes an intermediate plate 231 having a long hole shape parallel to the sides of the surface contact plate 22 extending in the horizontal direction, and a pair of cross linking plates 233, 233 whose width is smaller than that of the surface contact plate 22 in the horizontal direction. The intermediate plate 231 is hollowed to provide the deformation slit 232 whose shape is similar to the outer shape of the intermediate plate 231. The connection plate 23 in this example is provided on the side opposite to the connecting part of the body plate 21 at which an end of the deck cross member 3 is connected to have a positional relationship to sandwich the surface contact plate 22 between the body plate 21 and the connection plate 23. This is to, as described below, distinguish a restrained condition (driver seat side end 31) and unrestrained condition (passenger seat side end 32) of the surface contact plate 22 by using the fastening brackets 2 having the same structure on the driver seat and passenger seat sides (see FIGS. 4 and 5).

Figure 4:
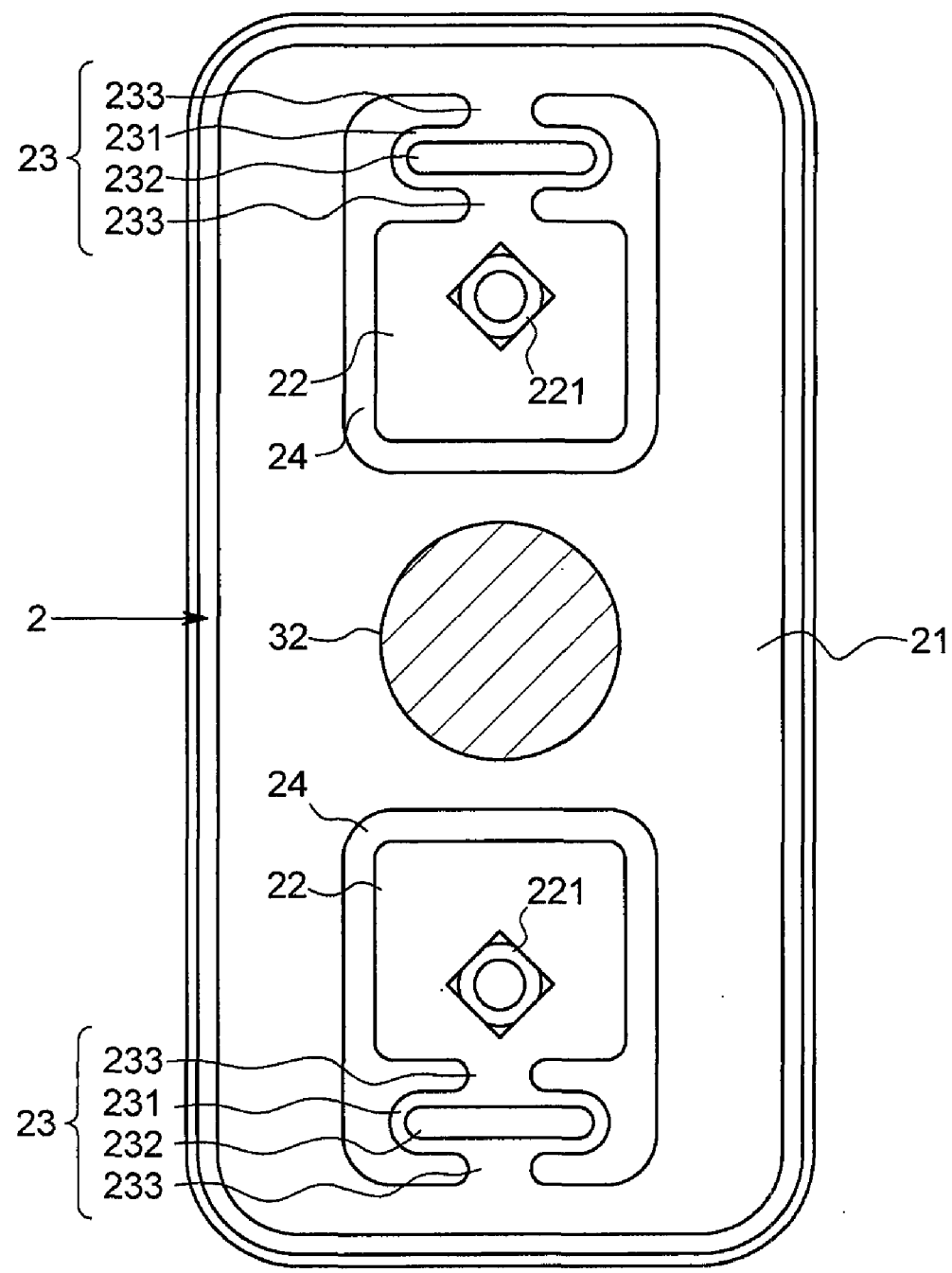
FIG. 4 is a front view illustrating a joint relation between the fastening bracket on a passenger seat side and an end of a deck cross member on the passenger seat side.
Figure 6:
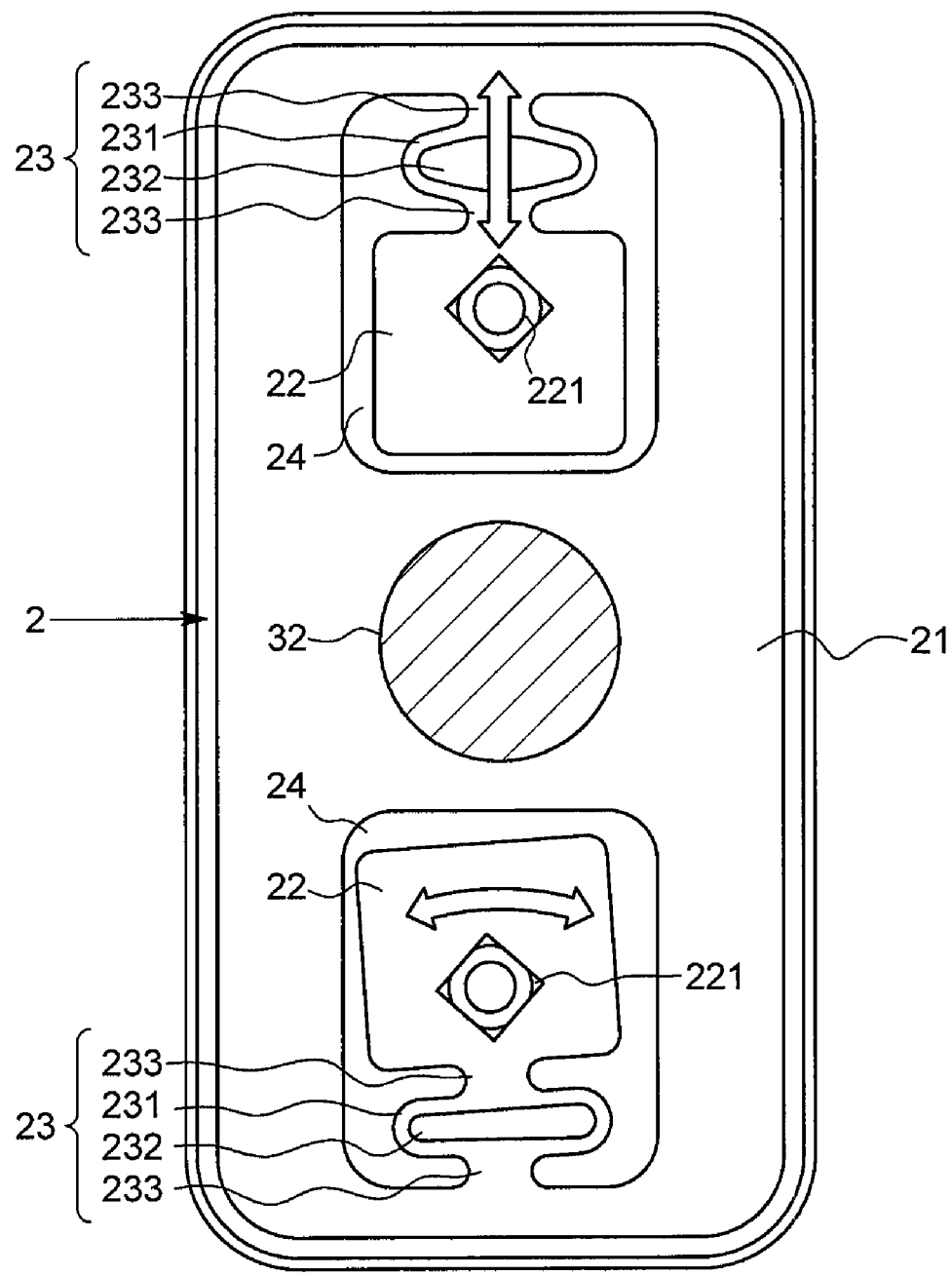
FIG. 6 is a front view corresponding to FIG. 4, illustrating a state where surface contact plates of the fastening bracket on the passenger seat side are displaced through plastic deformation of respective connection plates.

Specifically, to the fastening bracket 2 on the passenger seat side, the passenger seat side end 32 of the deck cross member 3 is joined only to the body plate 21 as illustrated in FIG. 4. Since the surface contact plate 22 is in the unrestrained state, at the passenger seat side end, the surface contact plate 22 can be close to and apart from the fitting part of the vehicle body frame 4 by elastic deformation or plastic deformation of the cross linking plates 233 or the intermediate plate 231 to adjust a gap between the surface contact plate 22 and the fitting part. Furthermore, as described below, a positional deviation between the fastening nut 221 fixed to the surface contact plate 22 and the bolt hole 41 can be eliminated by the elastic deformation or plastic deformation of the cross linking plates 233 or the intermediate plate 231 in the planner direction parallel to the fitting part (FIG. 6). This means that the strength of the passenger seat side end 32 depends only on the rigidity of the body plate 21.

Figure 5:
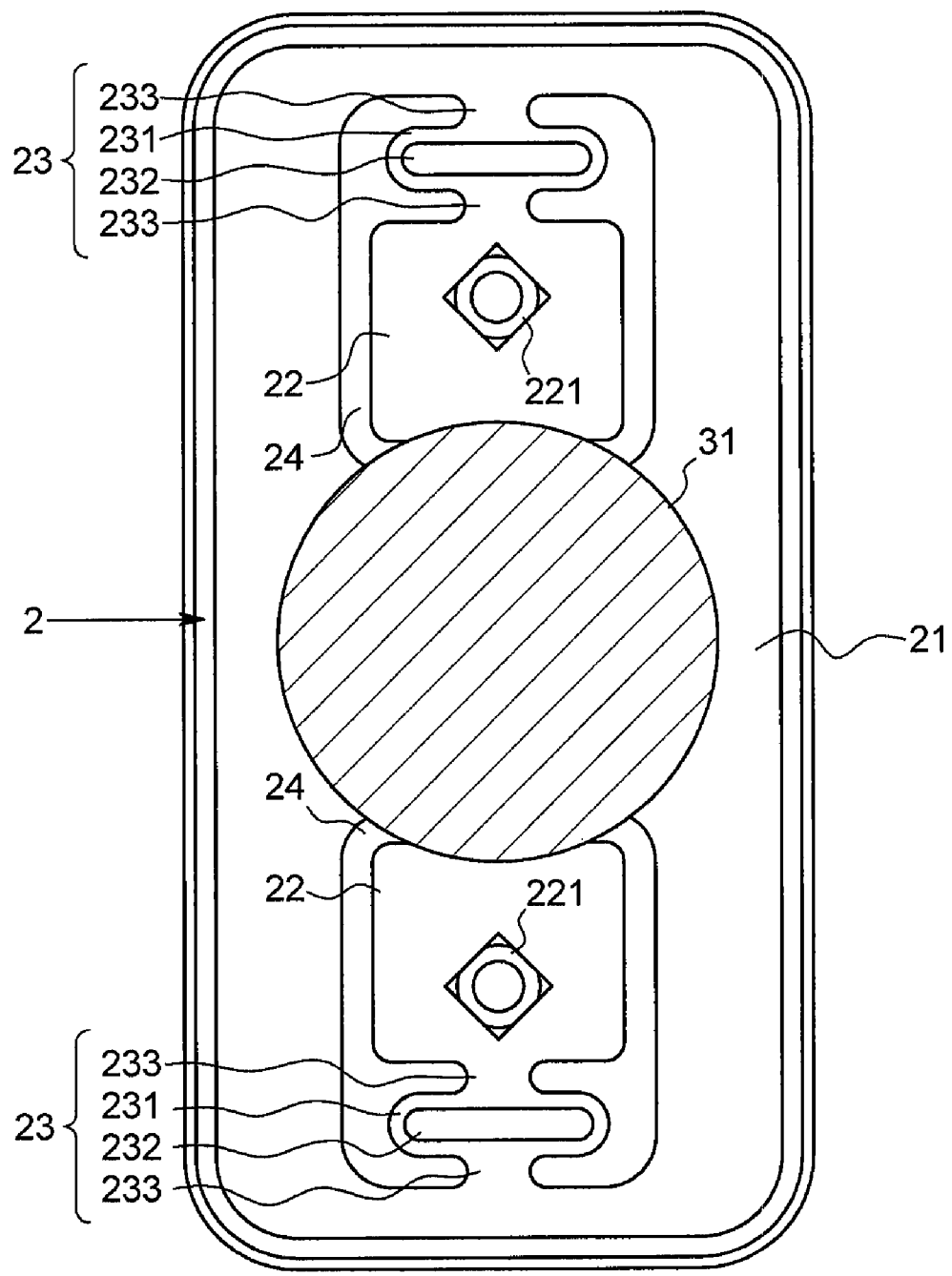
FIG. 5 is a front view illustrating a joint relation between the fastening bracket on a driver seat side and the deck cross member on the driver seat side.

On the other hand, to the fastening bracket 2 on the driver seat side, the driver seat side end 31 of the deck cross member 3 is joined to both of the body plate 21 and the surface contact plate 22 as illustrated in FIG. 5. Accordingly, the above-mentioned elastic deformation or plastic deformation of the connection plate 23 is restricted, so that the surface contact plate 22 does not come close to the fitting part of the vehicle body frame 4 or displaced in the planner direction. parallel to the fitting part. This is because the strength of the driver seat side end 31 is improved by the restriction of mutual deformation of the body plate 21 and the surface contact plate 22 through the driver seat side end 31, in addition to the rigidity of the body plate 21. In this manner, according to the invention, the strength of the fastening bracket 2 on the driver seat side can be increased relatively to the strength of the fastening bracket 2 on the passenger seat side while using the common right and left fastening brackets 2.

As described above, the fastening brackets 2 in this example adjust a gap with the fitting part of the vehicle body frame 4 and adjust a positional deviation between the fastening nut 221 and the bolt hole 41 through the elastic deformation or plastic deformation of the connection plate 23. A conventional similar type of bracket could also adjust a gap with the fitting part of the vehicle body frame 4. The fastening brackets 2 according to the invention are advantageous in that a positional deviation between the fastening nut 221 and the bolt hole 41 can be adjusted through the elastic deformation or plastic deformation of the connection plate 23 in the planner direction parallel to the fitting part. Specifically, as illustrated in FIG. 6, the connection plate 23 displaces the surface contact plate 22 in the vertical direction by expanding the deformation slit 232 (see the upper connection plate 23 in FIG. 6) or narrowing the deformation slit 232 to deform the intermediate plate 231. Furthermore, the surface contact plate 22 is displaced in the horizontal direction with one or both of the pair of cross linking plates 233 bent (see the lower connection plate in FIG. 6). In this mariner, the fastening brackets according to the invention. also adjust a positional deviation between the fastening nut 221 and the bolt hole 41.

Figure 7:
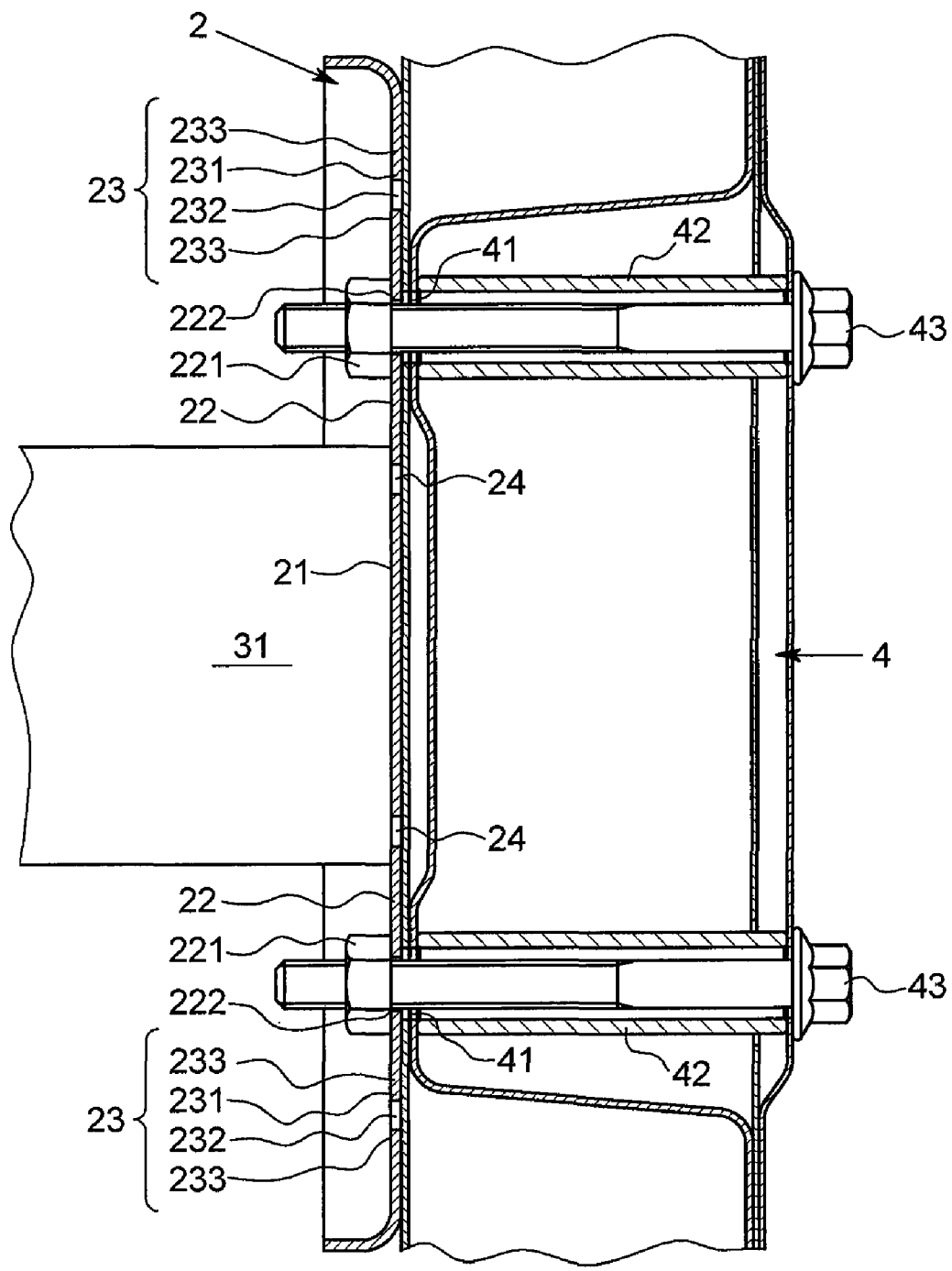
FIG. 7 is a vertical cross sectional view illustrating a state where the fastening bracket on the driver seat side has been connected to a vehicle body frame.

As illustrated in FIG. 7, on the driver seat side of the vehicle body frame 4, all of the body plate 21, the surface contact plate 22, and the connection plate 23 of the fastening bracket 2 are surface contacted with the fitting part (inner wall face of a member structuring the vehicle body frame 4), and a bolt 43 protruded through the bolt hole 41 leftward is screwed for joining into the fastening nut 221 through a spacer 42 interposed therebetween to prevent crashing. As is apparent, the connection plate 23 that is elastically deformed or plastically deformed is unnecessary for the fastening bracket 2 on the driver seat side, and the demarcating slit and the connection plate 23 decrease strength. Therefore, in order to assure sufficient strength also on the driver seat side while using the common right and left fastening brackets 2, the driver seat side end 31 of the deck cross member 3 is welded astride the body plate 21 and the surface contact plate 22 in this example. This prevents lowering of the strength caused by the demarcating slit 24 and the connection plate 23 and provides a relative strength difference from the fastening bracket 2 on the passenger seat side.

Figure 8:
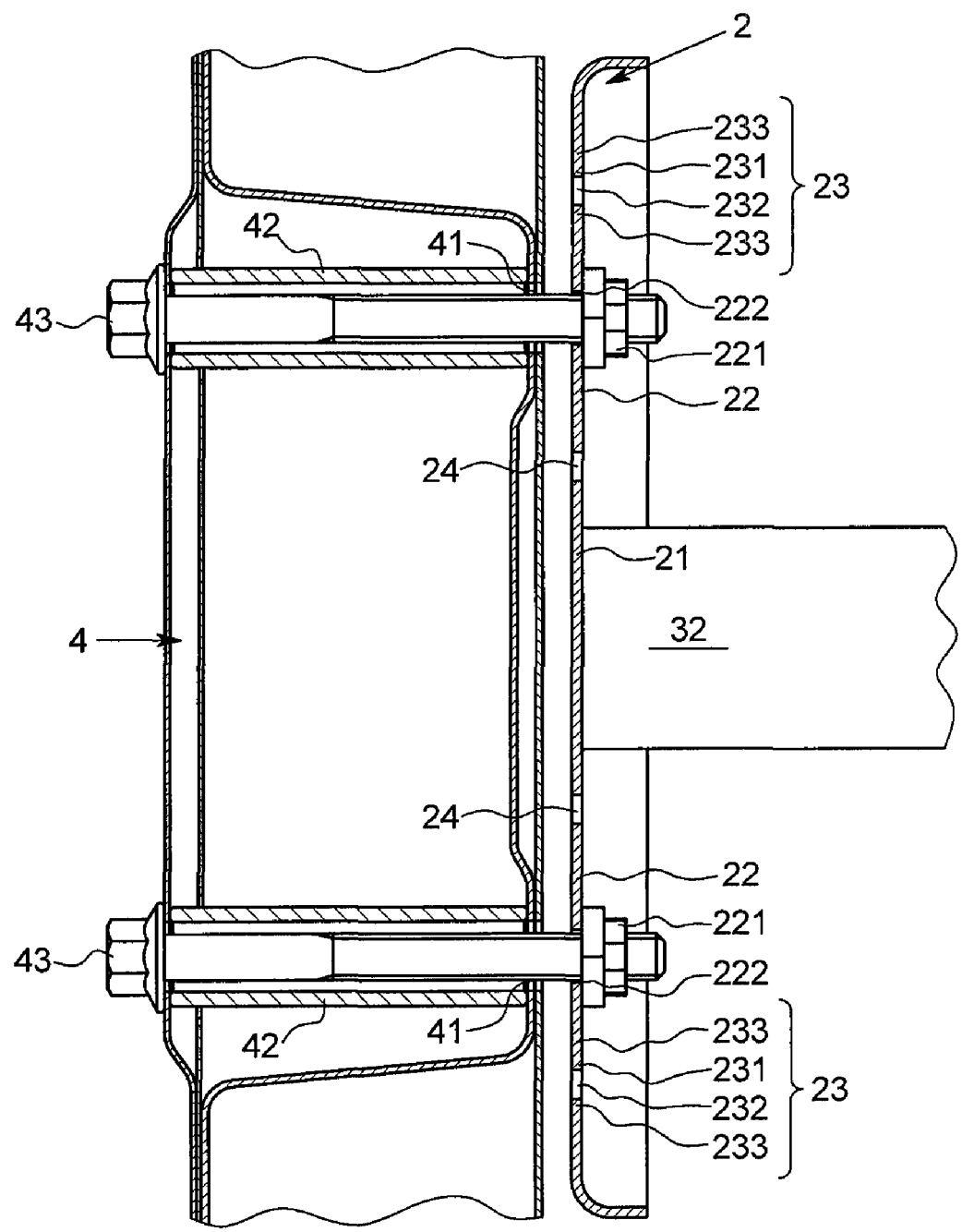
FIG. 8 is a vertical cross sectional view illustrating a state where the fastening bracket on the passenger seat side is applied to the vehicle body frame.

After the joining on the driver seat side is completed, joining on the passenger seat side follows. A positional deviation of the vehicle body frame 4 to the fitting part is adjusted on the passenger seat side of the vehicle body frame 4. The joining is performed as illustrated in FIGS. 8 and 9. First, the fastening bracket 2 is applied to the fitting part of the vehicle body frame 4 in the state where the body plate 21, the surface contact plate 22, and the connection plate 23 are aligned on a single plane. Then, the bolt 43 is inserted rightward into the through hole 222 provided to each of the upper and lower surface contact plates 22 through the spacer 42 and the bolt hole 41. Next, the bolt 43 is rotated to be engaged with the fastening nut 221. In this stage, when the positional deviation between the fastening nut 221 and the bolt hole 41 is large, the connection plate 23 deforms the intermediate plate 231 and bends the cross linking plates 233 in the planner direction parallel to the fitting part (see FIG. 6) to eliminate the positional deviation. Furthermore, when the positional deviation between the fastening nut 221 and the bolt hole 41 is small, the connection plate 23 deforms the intermediate plate 231 and bends the cross linking plates 233 in the planner direction parallel to the fitting part (see FIG. 6) to eliminate the positional deviation in a process for screwing the bolt 43 into the fastening nut 221.

When the bolt 43 engaged with the fastening nut 221 is being screwed, as illustrated in FIG. 9, since the movement of the head of the bolt 43 is restricted by the vehicle body frame 4, the fastening nut 221 begins to move to approach the vehicle body frame 4 relatively, and the surface contact plate 22 is pressed against the fitting part of the vehicle body frame 4. At this time, the surface contact plate 22 approaches the fitting part while deforming the intermediate plate 231 of the connection plate 23 and bending the cross linking plates 233 in a direction in which the surface contact plate 22 comes close to and separates from the fitting part. In this manner, the surface contact plate 22 approaches the fitting part through the elastic deformation or plastic deformation of the connection plate 23. Since the passenger seat side end 32 of the deck cross member 3 is connected to the body plate 21, the body plate 21 remains apart from the fitting part with a gap therebetween without the elastic deformation or plastic deformation of the connection plate 23. As a result, the strength of the fastening bracket 2 on the passenger seat side is relatively weakened as compared with that of the fastening bracket 2 on the driver seat side.

Figure 10:
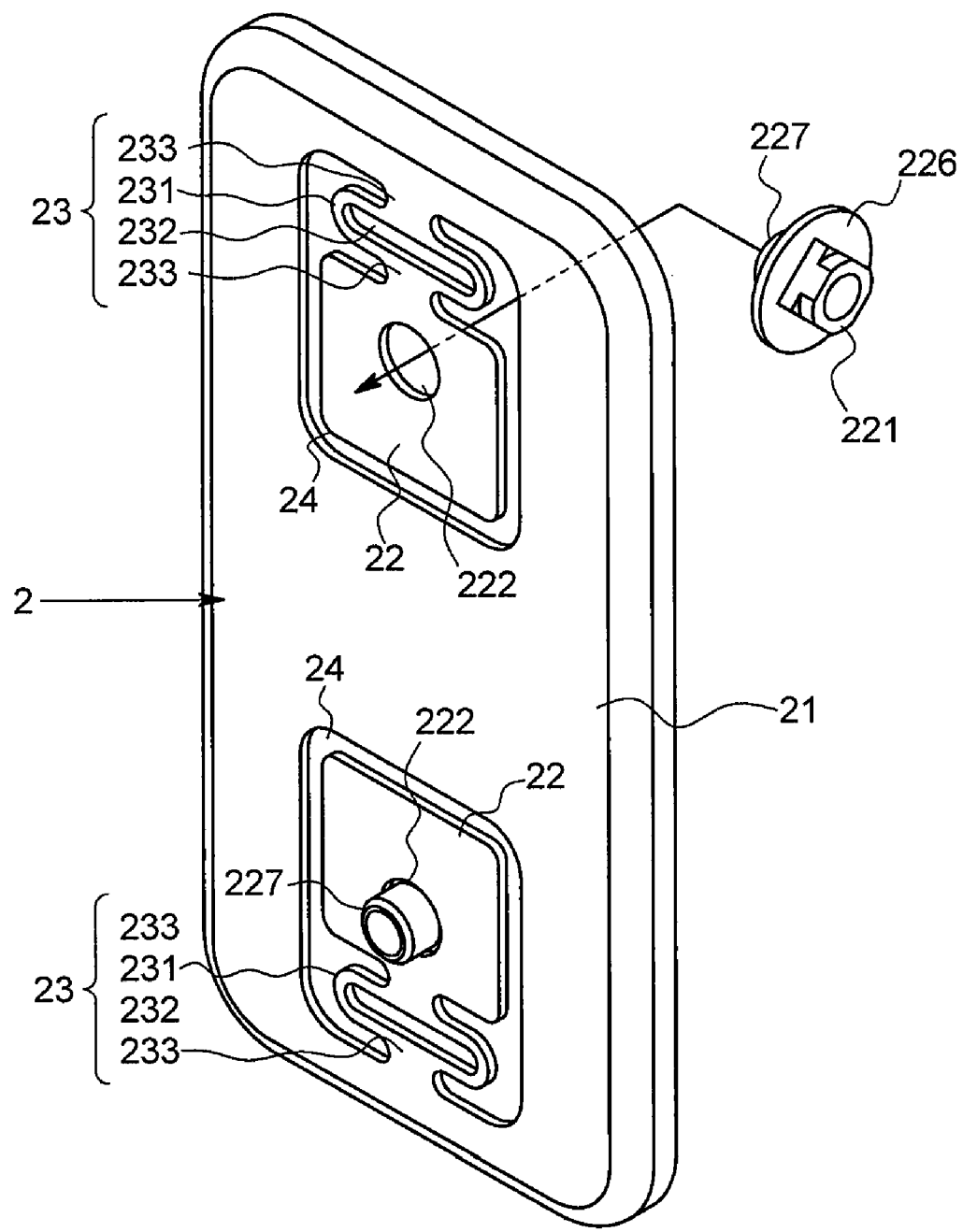
FIG. 10 is a perspective view corresponding to FIG. 2, illustrating a fastening bracket where a collar provided on a fastening nut is protruded from a though hole of the surface contact plate.
Figure 11:
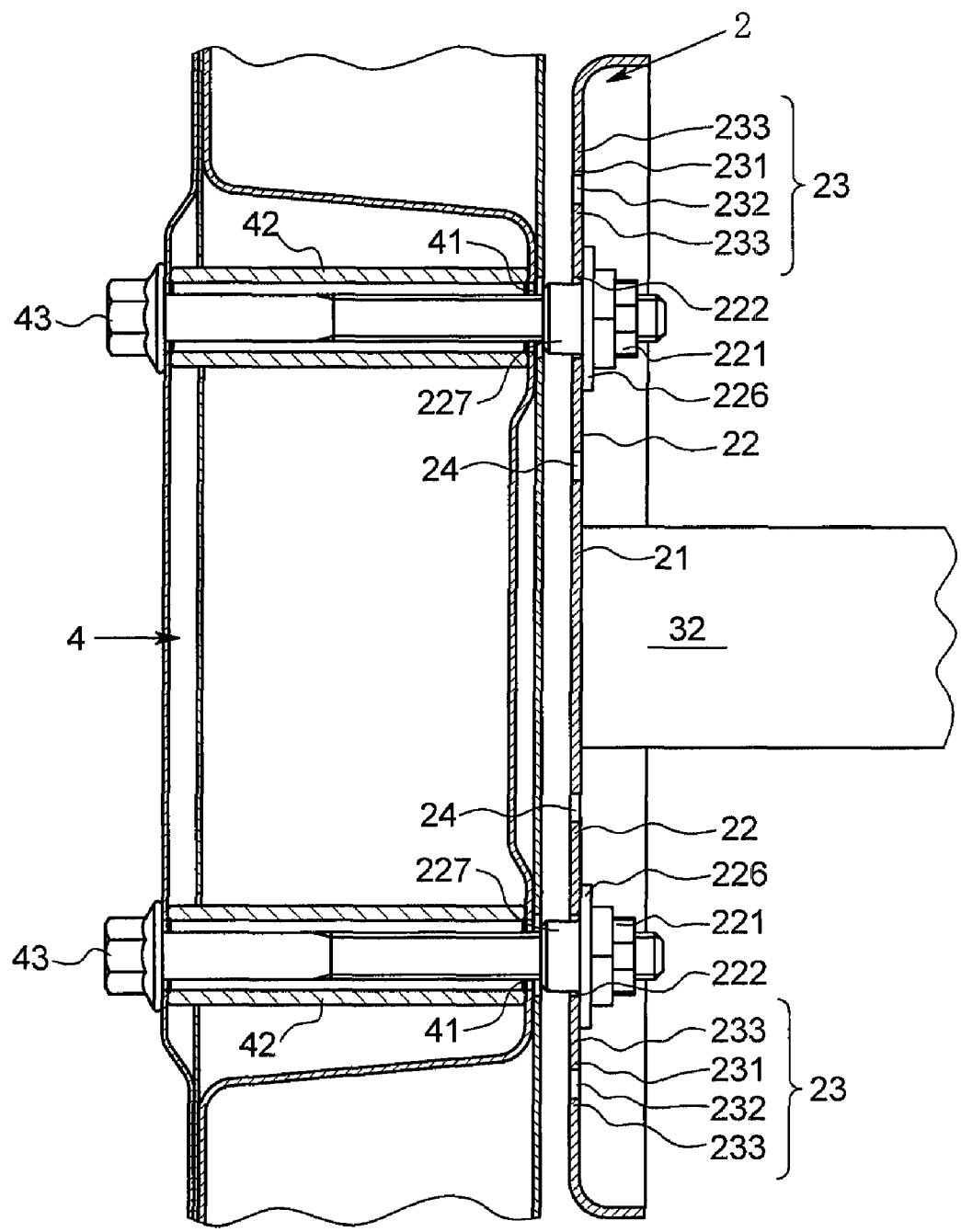
FIG. 11 is a vertical cross sectional view corresponding to FIG. 9, illustrating a state where the fastening bracket in which the collar provided on the fastening nut is protruded from the through hole of the surface contact plate has been connected to the vehicle body frame.
Figure 12:
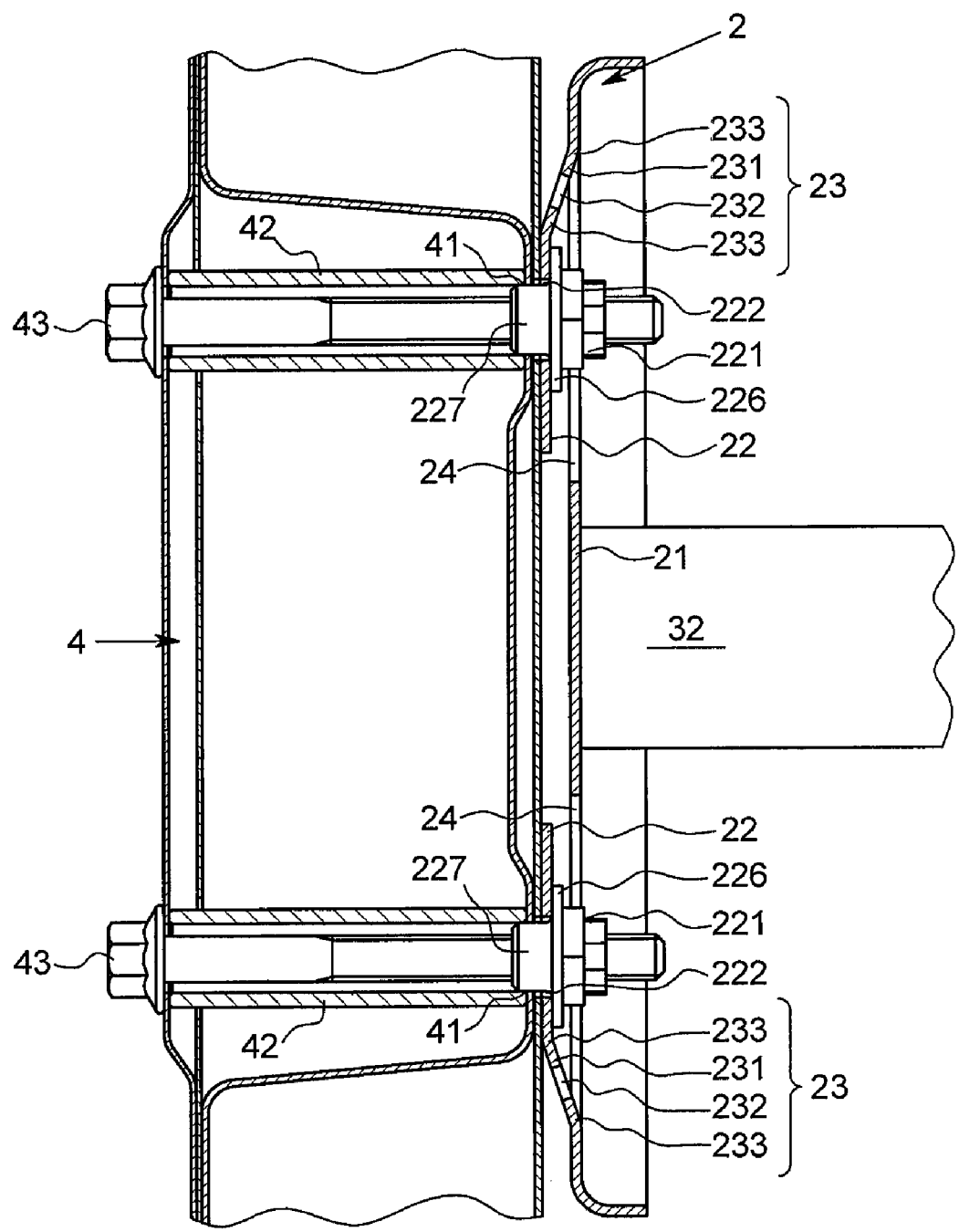
FIG. 12 is a vertical cross sectional view corresponding to FIG. 9, illustrating a state where the fastening bracket in which the collar provided on the fastening nut is protruded from the through hole of the surface contact plate has been connected to the vehicle body frame.

As described above, when there is a positional deviation between the fastening nut 221 and the bolt hole 41 at the stage where the bolt 43 is engaged with the fastening nut 221, the connection plate 23 deforms the intermediate plate 231 and bends the cross linking plates 233 in the planner direction parallel to the fitting part to eliminate the positional deviation. In this process, the bolt 43 to be screwed into the fastening nut 2 may be inclined. Therefore, it is preferable to provide a collar 227 to be locked into the bolt hole 41 provided at the fitting part of the vehicle body frame 4 on the surface contact plate 22 as illustrated in FIGS. 10 to 12. Accordingly, it becomes easy to lock the collar 227 into the bolt hole 41 (to be precise, the spacer 42 communicated with the bolt hole 41) in advance, thereby making the surface contact plate 22 approach the fitting part while keeping its parallel sate, and the fastening nut 221 with the bolt hole 41 match with each other.

As illustrated in FIG. 10, in this example, a member in which the fastening nut 221, a face contact flange 226, and a cylindrical flange are integrally formed is fitted to the through hole 222 to use as the collar 227. The cylindrical flange in this example includes the face contact flange 226 on the nut side, and the face contact flange 226 partially increases the thickness of the surface contact plate 22 to improve the rigidity. An end rim circumference of the collar 227 in this example is chamfered to be easily locked into the bolt hole 41. Alternatively, the surface contact plate 22 may be subjected to burring processing when the through hole 22 is bored and to processing to be used as a collar. Furthermore, the fastening nut 221, the face contact flange 226, and the cylindrical flange may be independent pieces.

The collar 227 of the integrated type illustrated in FIG. 10 is attached as described below. First, the collar 227 is fitted to the through hole 222 of the surface contact plate 22 communicated with a screw hole (female screw) of the fastening nut 221 to protrude from the surface contact plate 22. Then, the circumference of the face contact flange 226 is fixed to the surface contact plate 22 by welding. The fastening bracket 2 to which the collar 227 of the integrated type is fixed is attached to the fitting part of the vehicle body frame 4 in the following manner. First, the collar 227 is caused to face the bolt hole 41, and the bolt 43 is inserted into the spacer 42, the bolt hole 41, and the collar 227 in this order, and the bolt 43 is rotated to be screwed into the fastening nut 221. As illustrated in FIG. 11, when the bolt 43 is screwed into the fastening nut 221, the collar 227 is locked into the bolt hole 41 and the posture and approaching direction of the surface contact plate 22 with respect to the fitting part are regulated. When the bolt is further screwed, as illustrated in FIG. 12, the surface contact plate 22 is pressed against the fitting part and the attachment is completed. The face contact flange 226 partially increases the thickness of the surface contact plate 22 to improve the rigidity.

Figure 13:
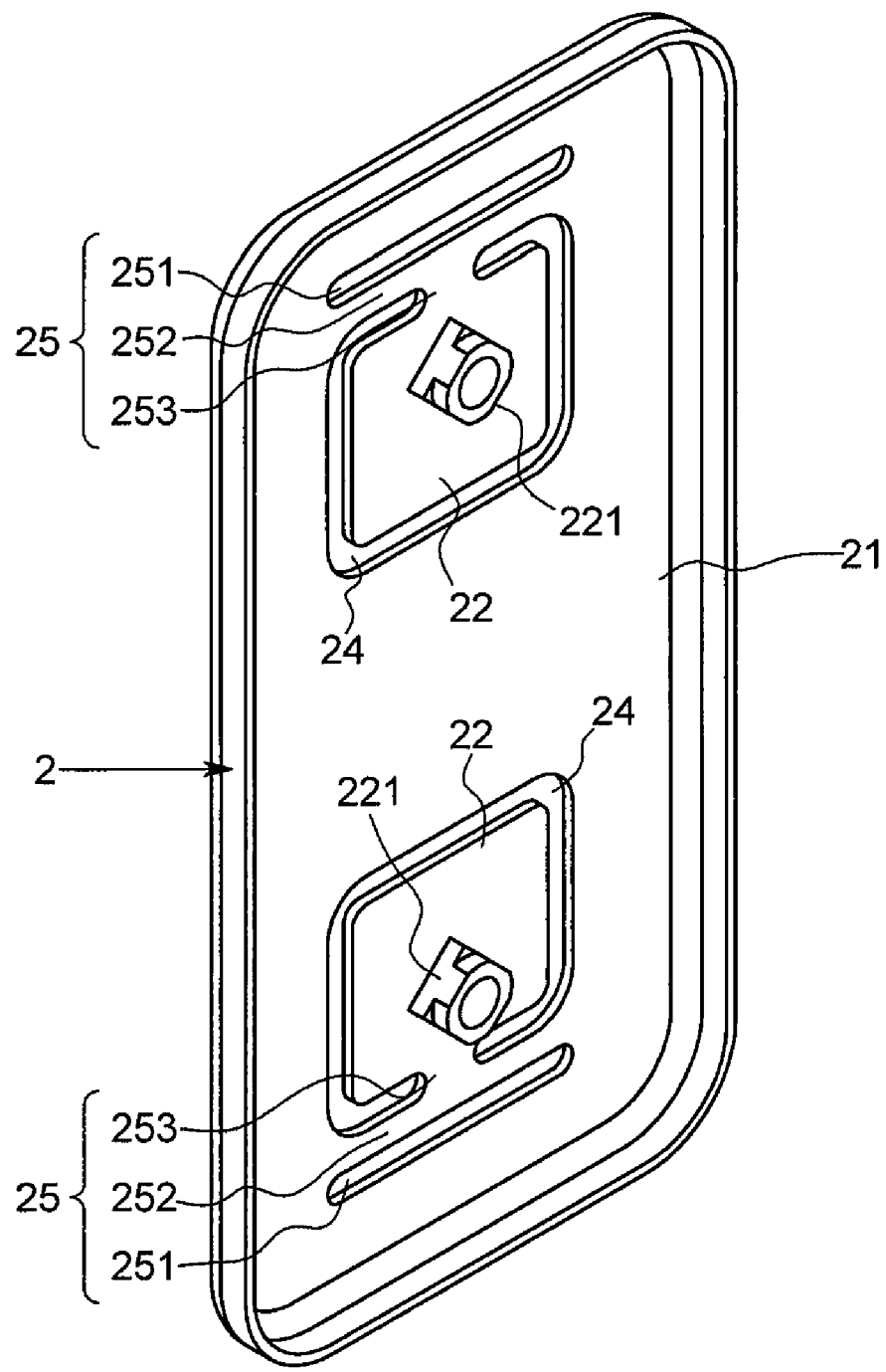
FIG. 13 is a perspective view corresponding to FIG. 3, illustrating a fastening bracket having a connection plate structured by a cross linking plate extending from a deformation beam formed of a body slit.

A connection plate 25 illustrated in FIG. 13 can be exemplified besides the connection plate 23 in this example (FIGS. 1 to 9). The connection plate 25 is structured of a body slit 251 provided in the body plate 21, a deformation beam 252 sandwiched between the body slit 251 and the demarcating slit 24, and a cross linking plate 253 extending from the deformation beam 252 to be connected to the surface contact plate 222. Since the body plate 21, the surface contact plate 22, and the connection plate 25 (deformation beam 252, cross linking plate 253) are structure by a piece of continued plate material, the plates can be formed at once by punching out portions of the demarcating slit 24 and the body slit 24 during press working, for example. In a stage where the connection plate 25 is not elastically deformed or plastically deformed, the body plate 21, the surface contact plate 22, and the connection plate 25 are aligned on a single plane.

The body slit 251 is perpendicular to the connecting direction of the body plate 21 and the surface contact plate 22 by the connection plate 25, is longer than the width of the cross linking plate 253 in the horizontal direction, and is shorter than the maximum outer shape width (distance of the circumference rim in the horizontal direction) of the demarcating slit 24 surrounding the connection plate 25. Accordingly, the deformation beam 252 is longer than the cross linking plate 253 in the horizontal direction and shorter than the maximum outer shape width of the demarcating slit 24 surrounding the connection plate 25, and the deformation beam 252 can be fully elastically deformed or plastically deformed while lowering of the structural strength of the body plate 21 is restrained. Specifically, the surface contact plate 22 elastically deforms or plastically deforms the cross linking plate 253 in a direction close to and apart from the fitting part of the vehicle body frame 4, elastically deforms or plastically deforms the deformation beam 252 to bend in the vertical direction to expand or contract the body slit 251, and in the case of FIGS. 1 to 9 elastically deforms or plastically deforms the cross linking plates 233 or the intermediate plate 231 in the planner direction parallel to the fitting portion. Accordingly, a gap between the surface contact plate 22 and the fitting part is eliminated, and a positional deviation between the fastening nut 221 fixed to the surface contact plate 22 and the bolt hole 41 is adjusted.

Figure 14:
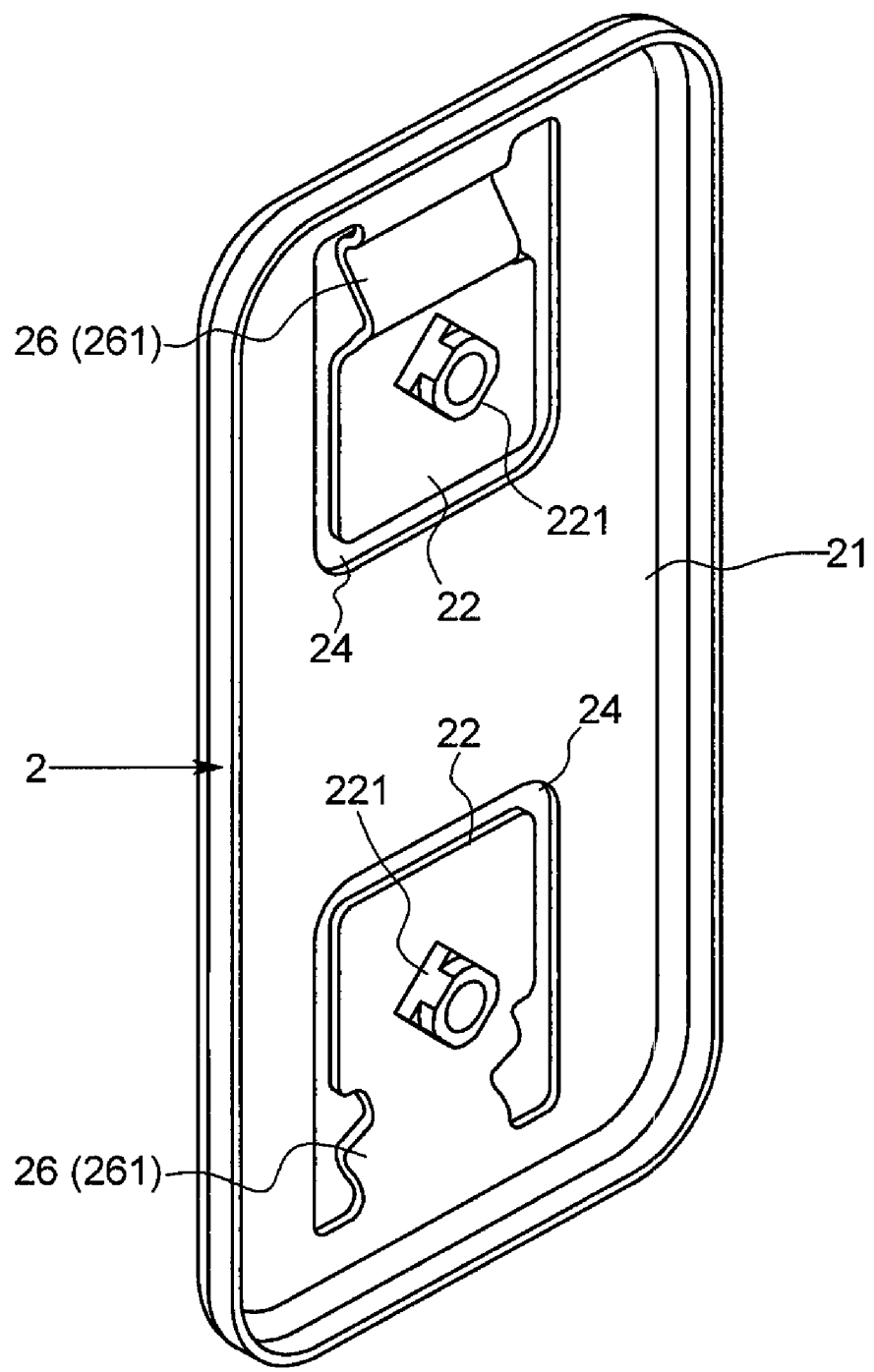
FIG. 14 is a perspective view corresponding to FIG. 3, illustrating a fastening bracket having a connection plate structured by a cross linking plate having a width equal to that of the surface contact plate and having a bent cross section.

A connection plate 26 of another example is structured of a cross linking plate 261 having a uniform width in the horizontal direction and bent in the thickness direction as illustrated in FIG. 14. One end of the cross linking plate 261 having the uniform width in the horizontal direction and bent in the thickness direction is connected to the body plate 21 and the other end is connected to the surface contact plate 22. Since the body plate 21, the surface contact plate 22, and the connection plate 26 (cross linking plate 261) are structured of a piece of continued plate material, the plates can be formed at once by punching out portions of the demarcating slit 24 during press working, for example. The cross linking plate 261 bent in the thickness direction is deformed along a mold together with the press working, or deformed by another press working, for example, after punching by the press working.

Figure 15:
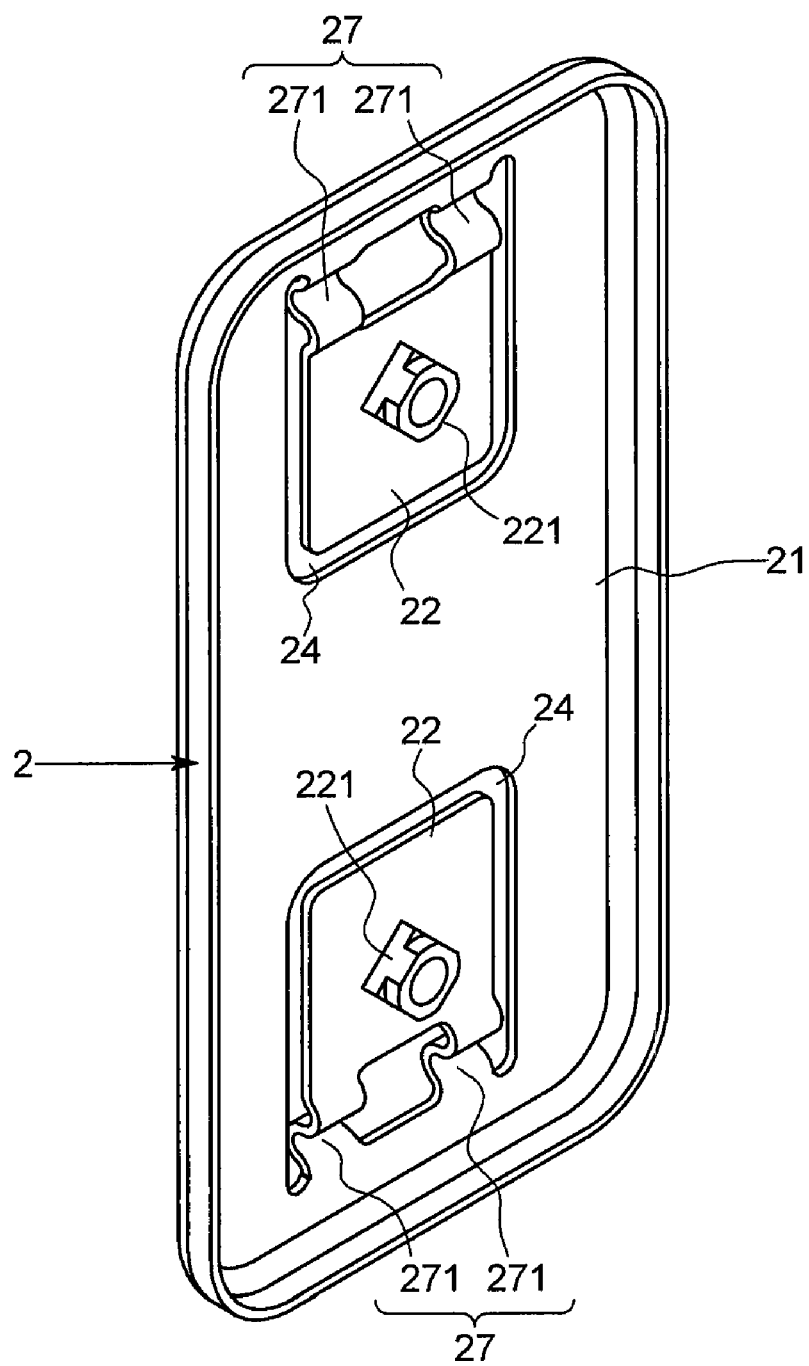
FIG. 15 is a perspective view corresponding to FIG. 3, illustrating a fastening bracket having a connection plate structured by a pair of right and left cross linking plates having a bent cross section.

Unlike the above-mentioned connection plate 23 (FIGS. 1 to 9) or the connection plate 25 (FIG. 13), the connection plate 26 structured of the cross linking plate 261 having the uniform width in the horizontal direction and bent in the thickness direction adjusts a gap between the surface contact plate 22 and the fitting part by elastically deforming or plastically deforming the bent cross section of the cross linking plate 261. When the deformation of the bent cross section of the cross linking plate 261 varies in the horizontal direction, the connection plate 26 is to be bent in the horizontal direction, which eliminates a position deviation between the fastening nut 221 fixed to the surface contact plate 22 and the bolt hole 41. In this case, as illustrated in FIG. 15 for example, when a connection plate 27 is structured of a pair of right and left cross linking plates 271 bent in the thickness direction, each cross linking plate 271 is elastically deformed or plastically deformed independently, so that it becomes easy to bent the connection plate 27 in the horizontal direction and eliminate a positional deviation between the fastening nut 221 fixed to the surface contact plate 22 and the bolt hole 41.

The invention claimed is:

1. A fastening bracket of a deck cross member used for fastening right and left ends of the deck cross member to respective fitting parts of a vehicle body frame, the fastening bracket comprising:
    a body plate to which one of the ends of the deck cross member is connected;
    a surface contact plate to which a fastening nut corresponding to a bolt to be inserted into corresponding one of the fitting parts of the vehicle body frame is fixed, the surface contact plate being provided in the body plate;
    a connection plate that is a part for connecting the body plate and the surface contact plate, the connection plate having a width in a direction perpendicular to a connecting direction of the body plate and the surface contact plate equal to or smaller than a width of the surface contact plate; and
    a portion defining a demarcating slit for demarcating the body plate and the surface contact plate.

2. The fastening bracket of a deck cross member according to claim 1, wherein the connection plate is provided on a side opposite to a connecting part of the body plate to which the end of the deck cross member is connected to have a positional relationship to sandwich the surface contact plate between the body plate and the connection plate.

3. The fastening bracket of a deck cross member according to claim 1, wherein the connection plate is structured of an intermediate plate provided with a deformation slit, and a pair of cross linking plates that connect the body plate with the intermediate plate and the surface contact plate with the intermediate plate, the cross linking plates having a width smaller than the intermediate plate.

4. The fastening bracket of a deck cross member according to claim 1, wherein the connection plate is structured of a cross linking plate having a uniform width in a width direction and being bent in a thickness direction, and an end of the cross linking plate is connected to the body plate and the other end is connected to the surface contact plate.

5. The fastening bracket of a deck cross member according to claim 1, wherein the connection plate is structured of a deformation beam sandwiched between a body slit provided in the body plate and the demarcating slit, and a cross linking plate extending from the deformation beam and connected to the surface contact plate.

6. The fastening bracket of a deck cross member according to claim 1, wherein the surface contact plate is provided with a collar to be locked into a bolt hole provided at the fitting part of the vehicle body frame.

7. The fastening bracket of a deck cross member according to claim 6, wherein the collar is a cylindrical flange integrally structured with the fastening nut and is protruded from a through hole of the surface contact plate to be communicated with a screw hole of the fastening nut.

* * * * *